(12) United States Patent
Van Dorp et al.

(10) Patent No.: US 10,791,700 B2
(45) Date of Patent: Oct. 6, 2020

(54) MILKING DEVICE

(71) Applicant: LELY PATENT N.V., Maassluis (NL)

(72) Inventors: Michiel Adriaan Van Dorp, Hazerswoude (NL); Erik Henk Christiaan Schutten, Rotterdam (NL)

(73) Assignee: LELY PATENT N.V., Maassluis (NL)

( * ) Notice: Subject to any disclaimer, the term of this patent is extended or adjusted under 35 U.S.C. 154(b) by 442 days.

(21) Appl. No.: 15/546,188

(22) PCT Filed: Nov. 30, 2015

(86) PCT No.: PCT/NL2015/050836
§ 371 (c)(1),
(2) Date: Jul. 25, 2017

(87) PCT Pub. No.: WO2016/122308
PCT Pub. Date: Aug. 4, 2016

(65) Prior Publication Data
US 2018/0338466 A1 Nov. 29, 2018

(30) Foreign Application Priority Data
Jan. 26, 2015 (NL) .................................. 2014186

(51) Int. Cl.
*A01J 5/007* (2006.01)
*A01J 5/04* (2006.01)
*A01J 5/16* (2006.01)

(52) U.S. Cl.
CPC ............. *A01J 5/007* (2013.01); *A01J 5/04* (2013.01); *A01J 5/16* (2013.01); *A01J 5/044* (2013.01); *A01J 5/047* (2013.01)

(58) Field of Classification Search
USPC .................... 119/14.01–14.55; 137/103, 907
See application file for complete search history.

(56) References Cited

U.S. PATENT DOCUMENTS 6,308,655 B1   10/2001  Oosterling
6,651,583 B1 * 11/2003  Lind ....................... A01J 5/007
                                                    119/14.02

(Continued)

FOREIGN PATENT DOCUMENTS

EP      2 805 606 A1   11/2014
NL        1037536 C     6/2011
WO   WO 2013/070063 A1   5/2013

OTHER PUBLICATIONS

International Search Report and Written Opinion dated Oct. 27 2016 in PCT/NL2015/050836 filed Nov. 30, 2015.

*Primary Examiner* — Andrea M Valenti
(74) *Attorney, Agent, or Firm* — Oblon, McClelland, Maier & Neustadt, L.L.P.

(57) ABSTRACT

A milking device including at least one milking cup with a teat space and a pulsation space, a pulsator connected by a pulsation line to the pulsation space of the milking cup and provided with a vacuum source, a vacuum line provided with a first controllable valve between the vacuum source and the pulsation line, an aeration line provided with a second controllable valve between the pulsation line and a source of higher pressure, and a pulsator control system for the first and second valves. The pulsator control system includes a flushing mode for opening and holding open the first and second valves during at least a predefined flushing time which is at least as long as the pulsation period.

22 Claims, 1 Drawing Sheet

(56) References Cited

U.S. PATENT DOCUMENTS

| | | | |
|---|---|---|---|
| 2011/0266476 A1* | 11/2011 | Schultz | A01J 5/14 251/129.15 |
| 2014/0174366 A1* | 6/2014 | Wilson | A01J 5/007 119/14.02 |
| 2014/0373787 A1* | 12/2014 | Petterson | A01J 5/007 119/14.02 |
| 2015/0019167 A1 | 1/2015 | Song et al. | |

* cited by examiner

MILKING DEVICE

FIELD

The invention relates to a milking device for performing milkings, comprising at least one milking cup with a teat space and a pulsation space, a pulsator connected by means of a pulsation line to the pulsation space of the milking cup and provided with a vacuum source for supplying a vacuum pressure suitable for pulsation of the pulsation space during milking, a vacuum line between the vacuum source and the pulsation line and provided with a first controllable valve, an aeration line between the pulsation line and a source of higher pressure than said vacuum pressure, and provided with a second controllable valve, and a pulsator control system for pulsation of the milking cup and configured for controlling the first and second valves with a pulsation period.

BACKGROUND

Such milking devices are known in themselves. Thus WO96/25036 discloses a milking device with a pulsator with two separately controllable valves.

Without going into the function of the known system during milking, this system in use does not appear to have a good effect on the function in all cases. For example, it appears to be difficult to get a clear picture of soiling of the pulsator, or to do something about possible soiling. Milking devices with such a pulsator therefore require more maintenance, which is undesirable in view of the milking capacity.

It is an object of the present invention to improve the known milking device, in particular its pulsator, such that said disadvantages are at least partly eliminated.

SUMMARY

For this, the invention proposes a milking device according to claim 1, in particular a milking device for performing milkings, comprising at least one milking cup with a teat space and a pulsation space, a pulsator connected by means of a pulsation line to the pulsation space of the milking cup and provided with a vacuum source for supplying a vacuum pressure suitable for pulsation of the pulsation space during milking, a vacuum line between the vacuum source and the pulsation line and provided with a first controllable valve, an aeration line between the pulsation line and a source of higher pressure than said vacuum pressure, and provided with a second controllable valve, and a pulsator control system for pulsation of the milking cup and configured for controlling the first and second valves with a pulsation period, wherein the pulsator control system comprises a flushing mode for opening and holding open the first and second valves during at least a predefined flushing time which is at least as long as and preferably longer than the pulsation period.

With the milking device, in particular the pulsator, according to the invention, it is possible to have both valves in an open state simultaneously. In this case, the vacuum source will draw in air from the environment, via the pulsator, in an initially unhindered flow. This flow may be used for example to flush the system with air ("blow through") but also for example to measure the air flow and/or pressure drops in the system, and on the basis thereof to determine the degree of soiling of the system. This will be explained in more detail below.

It is pointed out here that the system known from WO96/25036 discloses precisely the opposite, namely that the two valves are never open at the same time. In the known system, this is intended to prevent the teat from being undesirably subjected to vacuum and atmospheric pressure, which could lead to irritation or even injury to the teat. But this occurs only during milking. Outside the time of milking by the system, this setting is not necessary and it prevents the possibility of implementing an uninterrupted air flow through the system, so flushing is not possible here. Also note that in other conventional pulsators, often a three-way valve is used such as a sliding valve with a single opening, whereby it is physically impossible to open both channels (to vacuum and to atmosphere or to higher pressure) at the same time and thus provoke such an air flow.

It is pointed out here that any line, such as the pulsation line, may have only one channel but may also have several i.e. parallel part channels. It is also possible and even usual to have one pulsator per milking cup. Said vacuum source may be, and often is combined for a (the) plurality of pulsators in the milking device. Note that the vacuum line here is taken as the line between the first controllable valve and the vacuum source. It is however alternatively possible to regard the entire line between the vacuum source and the pulsation space as a vacuum line, in the case where a totally separate aeration line to the pulsation space is created. Often however the two lines merge, such as at the or a controllable valve. To prevent confusion, in the following there is assumed to be a vacuum line between the vacuum source and the first valve. Also, the "vacuum source" is not necessarily the required pump, but a buffer tank may also serve as this. This is not however relevant to the invention.

Finally, it is pointed out that the flushing time according to the invention is at least as long as or longer than the pulsation period. Herein, pulsation periods with a possibly changing length must be taken into account. Thus a pulsation period at the start of a milking may be shorter, for example to stimulate the teat. For the sake of clarity, we can say that the flushing time is at least as long as and preferably longer than the longest pulsation period during the actual milking, i.e. with a teat in the milking cup. This time is usually around 1 second. In particular, the pulsation period is therefore variable or adjustable, wherein the flushing time is as long as and preferably longer than the momentary pulsation period at the moment of triggering the flushing mode, and in particular longer than the longest pulsation period settable by the pulsation control system. Here the "momentary pulsation period" is equal to the most recent pulsation period. There is therefore sufficient time for flushing, which is intended to blow out any dirt from the system and thus requires some time.

In some embodiments, the milking device furthermore comprises an input device with which a user can enter into the pulsator control system an instruction for triggering the flushing mode. Thus the flushing mode can be started by the user as desired. Also, in addition or alternatively, it is possible to configure the milking device for automatically triggering the flushing mode, for example on the basis of a criterion. This will be discussed in more detail below.

In certain embodiments, the pulsator control system is configured for automatically triggering the flushing mode after completion of a predefined number of milkings, such as 1, 2 or 10 milkings, or after expiry of a predefined time period such as 1, 2 or 7 days, and after completion of any momentary milking. Thus, by regular flushing, soiling or even clogging of the pulsator system can be largely countered. It will be clear that other criteria are also possible, such as triggering a flushing mode after a disrupted milking, such as knocking over a milking cup.

In some embodiments, the predefined flushing time is at least 2 seconds, advantageously at least 10 seconds. As already indicated above, the flushing time is advantageously longer than a pulsation period, in order to have sufficient time to blow any dirt out of the system, and also to be able to build up sufficient air speed in the system. A time of 2 seconds is already sufficient, wherein a longer time such as at least 10 seconds allows better blowing clean. Other times are not excluded, such as depending on the length and the flow resistance of the system to be blown clean.

In some embodiments, the milking device further comprises a sensor device operatively connected to the pulsator control system for determining a parameter value which relates to the pulsation, wherein the pulsator control system is configured for triggering the flushing mode on the basis of the determined parameter value. This creates the possibility of matching the flushing action better to the actual situation, which can, inter alia, save energy and time for equivalent cleaning results.

A useful way of testing for soiling is precisely during flushing. In almost all pulsator systems, a filter is fitted at least in the air supply, to prevent dirt from penetrating when air is drawn in during pulsation or flushing. Such a filter, together with any valves and lines, offers a degree of flow resistance to the air which is blown through, which resistance becomes higher as the soiling increases. In some embodiments, the sensor device comprises an air flow meter in the vacuum line and/or in the aeration line, which air flow meter is configured for measuring an air flow in the respective vacuum and/or aeration line, and/or a pressure monitor for determining a pressure in the pulsation space, preferably for measuring during flushing. Measuring the air flow in this way either during pulsation or preferably during flushing gives an indication of the state of the system, namely of the one or more filters. On this basis, further action may be taken such as inspecting the system, replacement of an (air) filter etc. Note that the pressure monitor measures the pressure in the pulsation space but this is connected to the pulsation line, i.e. located upstream of any filter viewed from the measuring cup. Also, alternatively or even additionally, it is possible to configure the pressure monitor for determining the pressure in the pulsation line. In addition, other measurement devices are not excluded such as soiling meters which can measure the degree of soiling directly on the basis of electrical conductivity, weight, optical transparency or similar of a test plate, etc.

In particular, the pulsator control system is configured for registering said pressure and/or air flow at the time of flushing, in particular during the flushing time, evidently on the basis of the measurement from the respective measurement device. This makes it possible to obtain more information on the degree of soiling, and hence to be able to select flushing mode and subsequent flushing moments more suitably. For example, the pulsator control system is configured for emitting a warning signal if said determined pressure in flushing mode does not drop below a predefined first threshold value, and/or if said measured air flow in flushing mode does not at least reach a predefined threshold air flow. These situations are an indication of an undesirable obstruction, such as at least one filter which is too clogged, or a valve which no longer opens fully etc. However, if for example the filter to the environment is soiled and hence offers too high a flow resistance, firstly the maximum air flow will no longer reach the original value, so this original value or a predefined fraction thereof may serve as the first threshold pressure. Therefore in certain embodiments the aeration line contains an air filter between the second valve and the source of higher pressure, usually the ambient air. In such a case, if an alarm is given, i.e. if the threshold pressure is not reached, then it is possible for example to clean the filter by hand or replace it manually or automatically. Note that for example a valve or elbow in the line or similar could become soiled. If cleaning or replacing the filter has no effect or inadequate effect, then this could indicate soiling at another point, such as that stated.

In certain embodiments, the milking device comprises an air filter in the pulsation line and/or the vacuum line, wherein the pulsator control system is configured for registering said pressure during flushing as a function of time, and wherein the pulsator control system is configured for emitting a warning signal if said pressure as a function of time does not comply with a predefined criterion, in particular does not drop below a predefined second threshold pressure within a predefined time after the start of flushing mode, wherein more particularly the second threshold pressure is higher than the first threshold pressure. In such "cow-side" air filters which are intended to protect the vacuum source from dirt which penetrates for example due to a crack in a milking cup or hose, in the event of soiling, the lowest pressure to be reached will be higher than in an unsoiled system because of the extra pressure loss over the soiling. The filter can then be cleaned or replaced manually or automatically. However if the effect of such cleaning or replacement is inadequate, the soiling must have occurred elsewhere.

In certain embodiments, the milking device furthermore comprises a flushing liquid connection which is connected or connectable to the aeration line and in particular is connected to a flushing liquid source, wherein the pulsator control system is configured for having a liquid flushing action performed in the milking device, the liquid flushing action comprising triggering the flushing mode, connecting the aeration line to the flushing liquid source, and by means of the vacuum source flushing the flushing liquid through at least the aeration line. In particular, the flushing liquid connection is (already) connected to the flushing liquid source. In these embodiments, the pulsation system is cleaned with liquid. Thus a greater chemical power and/or greater mechanical force may be used for cleaning, which for example may be advantageous if normal flushing with air has inadequate effect. Naturally, it is also possible to clean with liquid every time, and then for example less often. As a flushing liquid, water alone may be used but also water with a detergent or other chemical substance dissolved or mixed therein.

BRIEF DESCRIPTION OF THE DRAWINGS

The invention will now be explained with reference to the drawing on which.

DETAILED DESCRIPTION

Figure 1:
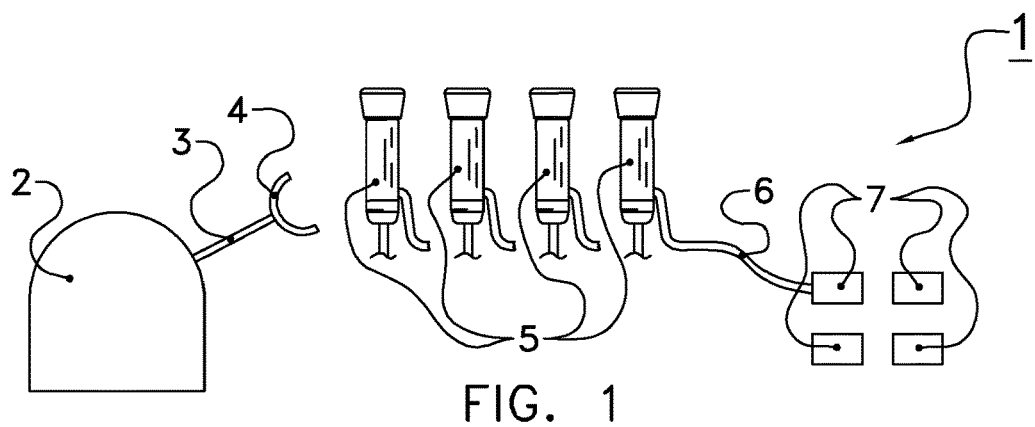
FIG. 1 is a highly diagrammatic view of a milking device according to the invention.

FIG. 1 shows highly diagrammatically a milking device 1 according to the invention, with a milking robot 2 provided with a robot arm 3 with a gripper 4, and with four milking cups 5 each provided with a pulsation line 6 (only one shown) and a pulsation device 7.

The milking device shown is a fully automatic milking device with a teat detection device (not shown separately) for detecting the teats of a milking animal to be milked, on which the milking robot 2 can place the milking cups 5 by means of the robot arm 3 and the gripper 4. Also, other types of milking device are possible such as those wherein the milking cups 5 are located on the arm 3 and there is no gripper 4, or also conventional milking devices without milking robot 2, 3, 4, wherein the milking cups 5 are applied to the teats by hand.

In all cases, after application of the milking cups 5, the milking device milks the teats using the pulsation devices 7, wherein—as is known—the pulsation devices 7 periodically alternately apply a reduced pressure and a higher, usually atmospheric, pressure in the pulsation space of the milking cups, in order thus to massage the teats during milking using the milking vacuum.

Figure 2:
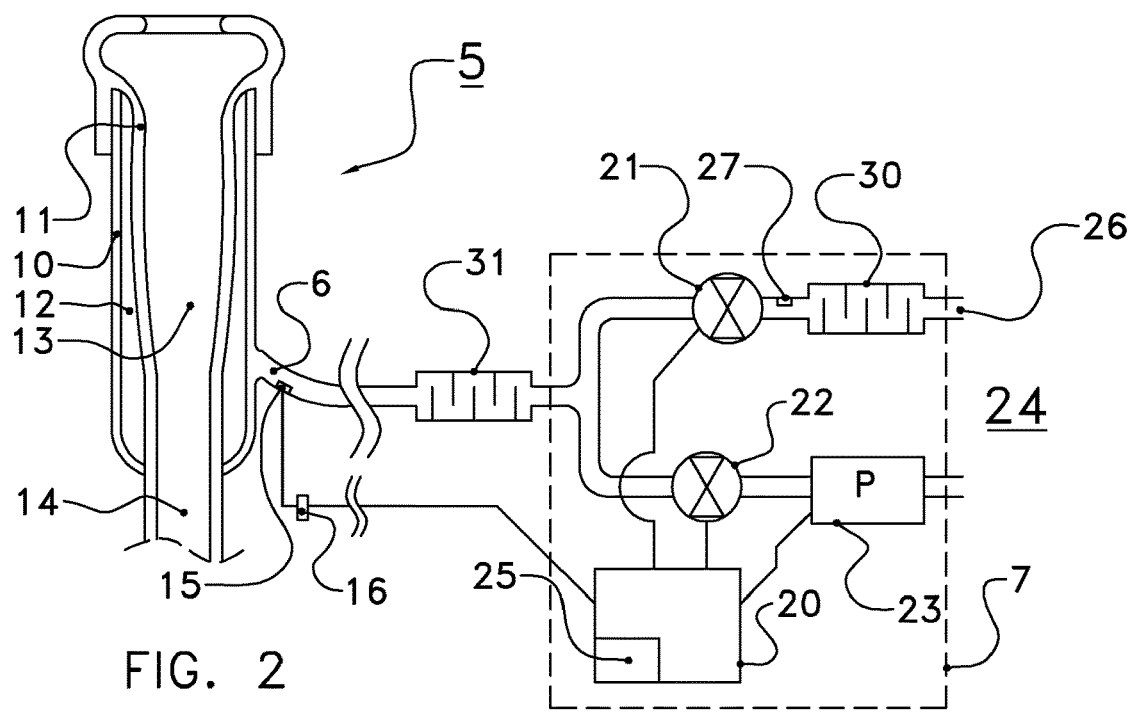
FIG. 2 is a diagrammatic view in partial cross-section showing a detail of the milking device of FIG. 1.

FIG. 2 shows a detail of the milking device 1 of FIG. 1 in diagrammatic view, partly in cross-section.

Here a milking cup 5 comprises a cup wall 10, a liner 11, in between these a pulsation space 12, and on the inside a teat space 13 which opens into a milk line 14. 15 indicates a pulsation pressure sensor which is connected to a pressure measurement device 16.

7 again indicates diagrammatically the pulsation device which here comprises a pulsation control system 20, a first valve 21, a second valve 22, a pump 23, an input device 25 and a supply opening 26 to the environment 24. 27 indicates an optional air flow meter.

The milking cup 5 shown is depicted simplified. Thus the liner 11 usually transforms via an auxiliary piece or other transition into the milking line 14, but this is not relevant to the invention.

The pulsation pressure sensor 15 is shown in the pulsation line 6 but may also be received in the pulsation space 12 itself. The sensor 15 is connected to a pressure measurement device 16, which here receives the signal from the sensor 15 and processes (e.g. amplifies) it into a usable pressure signal which is transmitted to the pulsation control system 20. On the basis of this pressure signal or otherwise, the pulsation control system 20 controls the pulsation in the pulsation space 12 by alternately opening the second valve 22 while the first valve 21 is closed, whereby the space 12 is connected to the pulsation vacuum created by the (vacuum) pump 23, and then closing the second valve 22 and opening the first valve 21, whereby the space 12 is connected to the environment 24. Thus ambient air is drawn in via the supply opening 26. Note that that may also be a source of another pressure which is higher than the pulsation vacuum.

When air flows in from the environment, it first passes the first filter 30 which retains dirt, flies and similar. Then a second filter 31 is provided here which retains any penetrating dirt from the milking cup, such as if a liner cracks, or dirt has penetrated during changing of the liner 11 or otherwise.

According to the invention, after milking, the pulsation control system 20 will set both the first valve 21 and the second valve 22 open. In this way there is a more or less open connection between the environment 24 and the pump 23. Quite a strong air flow will be created, which is able to remove dirt which may have settled in the lines which connect the parts of the pulsation device together and to the milking cup 5. This blow-through need not take place after each milking, but for example after every 2 milkings, or once a day etc. Blowing through in this flushing state may take place for a predefined period such as a few seconds.

This flushing of the lines by opening both valves simultaneously may be used for inspection of the system. This is explained in more detail in connection with FIG. 3. As soon as both valves 21 and 22 are opened, the pressure as measured by the pressure sensor 15 and the measuring device 16 will drop. The cleaner the system, the lower the air resistance through the lines and in particular also over the filters 30 and 31. A clean system should then reach a lower end pressure, and the pressure will drop more quickly than in a soiled system. Both effects may be used for assessing in particular the degree of soiling of the filters 30 and 31. Partly on this basis, the pulsation control system 20 may decide to perform a further flushing action, wherein the valves 21 and 22 are opened, or decide to adapt the regime of flushing actions, such as once every 10 milkings instead of once every 20 milkings etc. Such a regime is for example entered by means of the input device 25 such as a keypad. It is also possible that an alarm is generated which is sent to an operator, or a signal is emitted to an external system, such as for example a mobile telephone or external management system.

Figure 3:
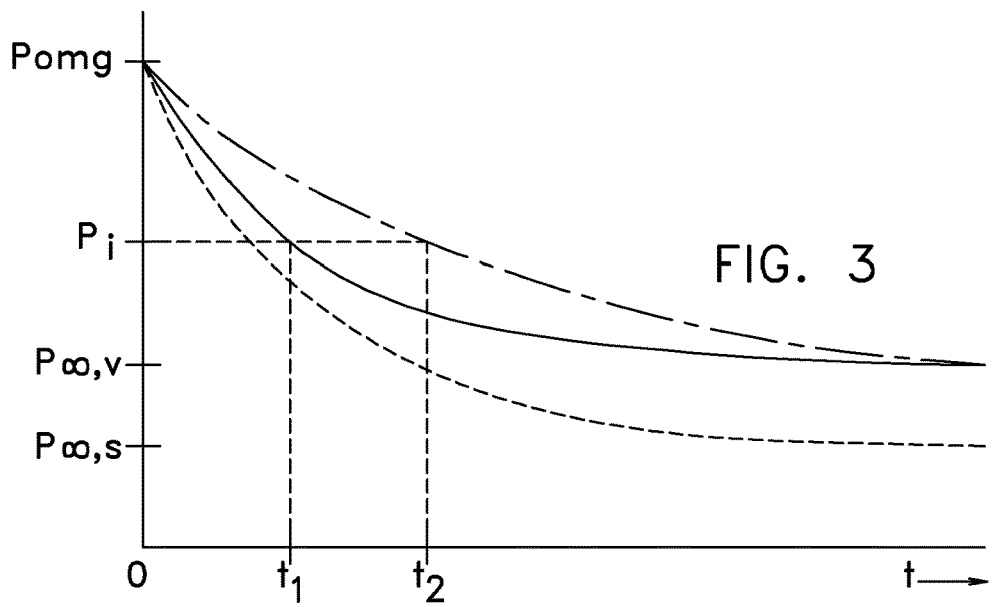
FIG. 3 is a diagram showing different pressure developments over time.

It is also possible to assess the filters 30 and 31 separately. The end pressure in the system will however depend only on the resistance over the first filter 30, assuming that the greatest pressure drop occurs there. In an equilibrium situation, there is no pressure drop or only a negligible pressure drop over the second filter 31, because there is no residual air flow therethrough. This is indicated in FIG. 3 with the separate line in the graph which runs from atmospheric pressure $P_{omg}$ to the (asymptotic) end pressure $P_{\infty,v}$ in a soiled situation. This can be compared by the pulsation control system 20 or by an operator to an end pressure in the clean situation, such as when a clean first filter 30 has just been fitted. In this case, the development will be as shown by the dotted line and the end pressure will be $P_{\infty,S}$. By comparing $P_{\infty,v}$ and $P_{\infty,S}$, conclusions can be drawn about the extent of soiling. In this way it is easy to determine a threshold value which must be reached at least. In other words, if the end pressure does not drop below (or reach) the threshold value, then there is too much soiling in the pulsation system and a warning is given, or if the first filter 30 is a filter which can be replaced automatically, the first filter 30 is replaced by a clean new filter under the control of the pulsation control system 20. Naturally a second test may then be carried out to establish whether replacement of the first filter 30 has solved the problem. If not, in other words if the threshold value is still not reached or passed, another problem exists.

It is noted here that instead of measuring the pressure, a degree of soiling of the first filter can be established by means of an air flow meter 27. With a heavily soiled first filter 30, a lower air flow through the system will be measured. Again, other methods and devices for measuring the degree of soiling are not excluded here, such as optical assessments of the filter or electrical measurements thereon.

The degree of soiling of the second filter 31, which is also optional, can also be established by looking at the pressure development during the flushing action. The air in the pulsation space 12 and the part of the pulsation line 6 after the second filter 31 must always pass through the second filter 31. If the second filter 31 is greatly soiled, it will be more difficult for the air to escape and the pressure in the space will drop more slowly. This is shown in FIG. 3 by the dotted-dashed line for the case where the second filter is more soiled than in the case of the solid line. Note that the end pressure for both cases is the same.

$P_i$ in the graph indicates an intermediate pressure between $P_{omg}$ and the end pressure $P_{\infty,v}$. This intermediate pressure $P_i$ can in fact only be determined after reaching the end pressure, so it is favourable to measure the pressure development over time. By then measuring the time required to reach the intermediate pressure $P_i$, this is $t_1$ and $t_2$ for the situation with a clean second filter 31, and a soiled second filter 31, respectively, then a degree of soiling for the second filter 31 can be deduced. Again, soiling may be present elsewhere but this can be checked after exchanging or cleaning the second filter 31.

It is also noted here that in some embodiments, it is possible to flush the pulsation device 7 with liquid. For this, liquid is supplied via the supply opening 26, which liquid then is fed through the system via the pump 26 and discharged again to the environment 24. In this case the pump 23 should be suitable for pumping air and liquid. Alternatively, another pump may be used, either pumping the liquid in under pressure or pumping it out with reduced pressure.

The embodiment shown is not intended to be restrictive but serves merely to illustrate the invention. The scope of protection is determined from the attached claims.

The invention claimed is:

1. A milking device for performing milkings, comprising:
   at least one milking cup with a teat space and a pulsation space,
   a pulsation system comprising the pulsation space and a pulsator, the pulsator connected by a pulsation line to the pulsation space of the milking cup, and the pulsator provided with:
   a vacuum source for supplying a vacuum pressure suitable for pulsation of the pulsation space during milking,
   a vacuum line between the vacuum source and the pulsation line, and provided with a first controllable valve,
   an aeration line between the pulsation line and a source of higher pressure than said vacuum pressure, and provided with a second controllable valve, and
   a pulsator control system for pulsation of the milking cup, and configured for controlling the first and second valves with a pulsation period and configured to control a flushing mode for flushing the pulsation system to remove dirt, and/or measure pressure drops in the milking device, and/or measure air flow in the milking device, the flushing mode comprising simultaneously holding open the first and second valves during at least a predefined flushing time which is at least as long as the pulsation period.

2. The milking device according to claim 1, wherein the pulsation period is variable or adjustable, and wherein the flushing time is longer than a momentary pulsation period at a moment of triggering the flushing mode.

3. The milking device according to claim 1, comprising an input device with which a user can enter into the pulsator control system an instruction for triggering the flushing mode.

4. The milking device according to claim 1, wherein the pulsator control system is configured for automatically triggering the flushing mode after completion of a predefined number of makings.

5. The milking device according to claim 1, wherein the predefined flushing time is at least 2 seconds.

6. The milking device according to claim 1, furthermore comprising a sensor device operatively connected to the pulsator control system for determining a parameter value which relates to the pulsation, wherein the pulsator control system is configured for triggering the flushing mode on the basis of the determined parameter value.

7. The milking device according to claim 6, wherein the sensor device comprises an air flow meter in at least one of the vacuum line and the aeration line, which air flow meter is configured for measuring an air flow in the respective vacuum and/or aeration line.

8. The milking device according to claim 7, wherein the pulsator control system is configured for registering a measurement from the sensor device at the time of flushing.

9. The milking device according to claim 6, wherein the sensor device comprises a pressure monitor for determining a pressure in the pulsation space.

10. The milking device according to claim 7, wherein the aeration line contains an air filter between the second valve and a source of higher pressure.

11. The milking device according to claim 7, furthermore comprising an air filter in the pulsation line and/or the vacuum line, wherein the pulsator control system is configured for registering said pressure during flushing as a function of time, and wherein the pulsator control system is configured for emitting a warning signal if said pressure as a function of time does not comply with a predefined criterion.

12. The milking device according to claim 11, wherein the pulsator control system is configured for emitting a warning signal if said pressure as a function of time does not does not drop below a predefined second threshold pressure within a predefined time after a start of the flushing mode.

13. The milking device according to claim 7, wherein the pulsator control system is configured for emitting a warning signal if said measured air flow in the flushing mode does not at least reach a predefined threshold air flow.

14. The milking device according to claim 9, wherein the pulsator control system is configured for emitting a warning signal if the presure was determined by the presure monitor and said determined pressure in the flushing mode does not drop below a predefined first threshold value.

15. The milking device according to claim 1, furthermore comprising a flushing liquid connection which is connected or connectable to the aeration line, wherein the pulsator control system is configured for having a liquid flushing action performed in the milking device, the liquid flushing action comprising triggering the flushing mode, connecting the aeration line to the flushing liquid source, and by means of the vacuum source flushing the flushing liquid through at least the aeration line.

16. The milking device according to claim 15, wherein the flushing liquid connection is connected to a flushing liquid source.

17. The milking device according to claim 1, wherein the predefined flushing time is longer than the pulsation period.

18. The milking device according to claim 1, wherein the pulsation period is variable or adjustable, and wherein the flushing time is longer than a longest pulsation period settable by the pulsation control.

19. The milking device according to claim 1, wherein the pulsator control system is configured for automatically triggering the flushing mode after expiry of a predefined time period and after completion of any momentary milking.

20. The milking device according to claim 1, wherein the predefined flushing time is at least 10 seconds.

21. A milking device for performing makings, comprising:
   at least one milking cup with a pulsation space,
   a pulsator connected by a pulsation line to the pulsation space of the milking cup and provided with:

a vacuum source for supplying a vacuum pressure suitable for pulsation of the pulsation space during milking, a vacuum line between the vacuum source and the pulsation line, and provided with a first controllable valve, an aeration line between the pulsation line and a source of higher pressure than said vacuum pressure, and provided with a second controllable valve, and a pulsator control system for pulsation of the milking cup and configured for controlling the first and second valves with a pulsation period, and a flushing liquid connection which is connected or connectable to the aeration line, wherein the pulsator control system comprises a flushing mode for simultaneously holding open the first and second valves during at least a predefined flushing time which is at least as long as the pulsation period, and wherein the pulsator control system is configured to perform a liquid flushing action in the milking device, the liquid flushing action comprising triggering the flushing mode, connecting the aeration line to the flushing liquid source, and by means of the vacuum source flushing the flushing liquid through at least the aeration line.

22. A method of flushing a milking device, the milking device comprising at least one milking cup with a teat space and a pulsation space, a pulsation system comprising the pulsation space and a pulsator, the pulsator connected by a pulsation line to the pulsation space of the milking cup, and the pulsator provided with a vacuum source for supplying a vacuum pressure suitable for pulsation of the pulsation space during milking, a vacuum line between the vacuum source and the pulsation line, and provided with a first controllable valve, an aeration line between the pulsation line and a source of higher pressure than said vacuum pressure, and provided with a second controllable valve, and a pulsator control system for pulsation of the milking cup, the method comprising:

triggering a flushing mode;

controlling with the pulsator control system the first and second valves with a pulsation period; and simultaneously holding open the first and second valves during at least a predefined flushing time which is at least as long as the pulsation period in order to flush the pulsation system to remove dirt, and/or measure pressure drops in the milking device, and/or measure air flow in the milking device.

\* \* \* \* \*